INVENTOR.
ICHIRO SOMA
BY
OSTROLENK, FABER, GERB & SOFFEN
ATTORNEYS

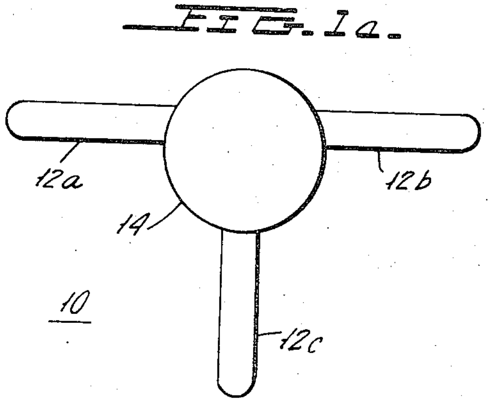
FIG. 1a.
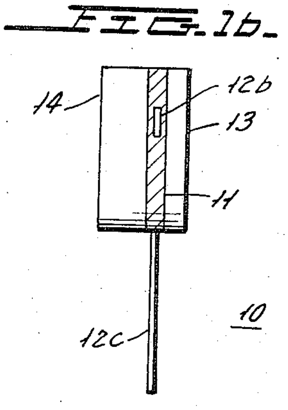
FIG. 1b.
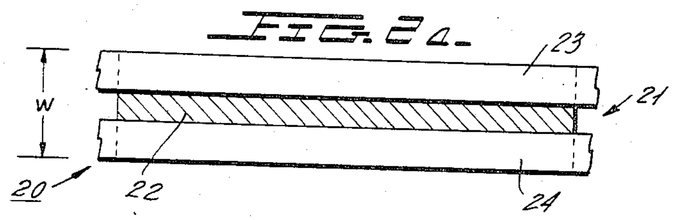
FIG. 2a.
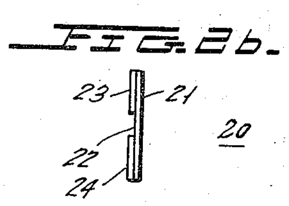
FIG. 2b.
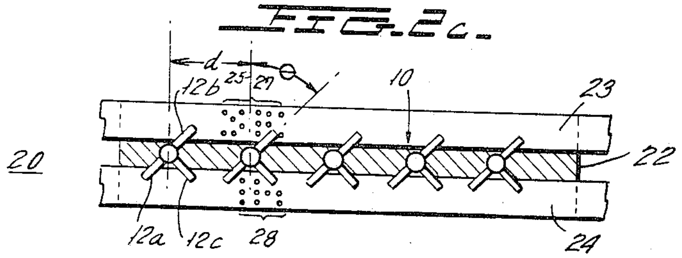
FIG. 2c.
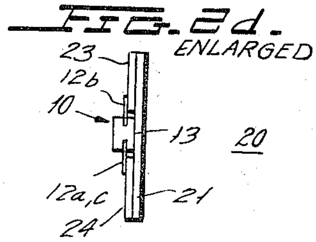
FIG. 2d. ENLARGED
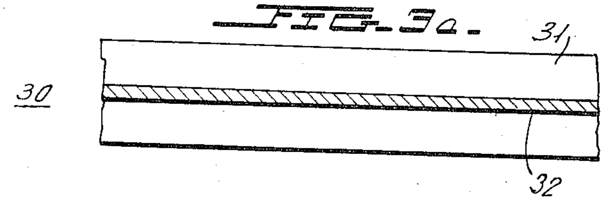
FIG. 3a.
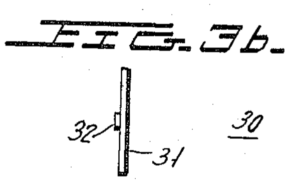
FIG. 3b.
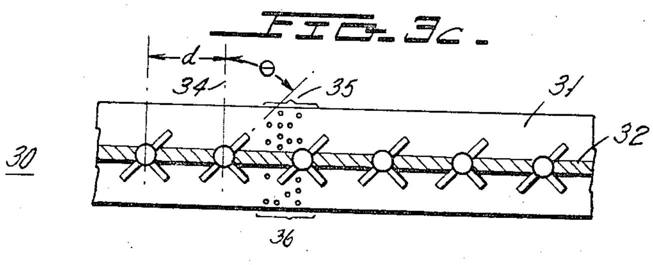
FIG. 3c.
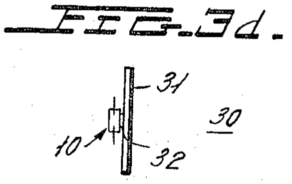
FIG. 3d.
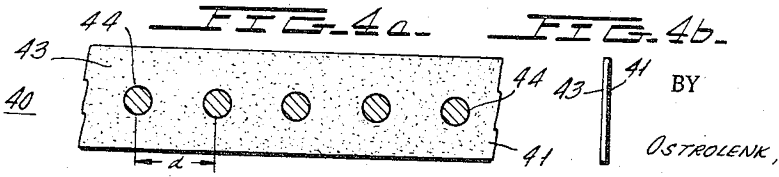
FIG. 4a. FIG. 4b.
INVENTOR.
ICHIRO SOMA
BY
OSTROLENK, FABER, GERB & SOFFEN
ATTORNEYS Aug. 15, 1967 ICHIRO SOMA 3,335,852
MOUNTING ASSEMBLY SUPPORTING SEMICONDUCTOR DEVICES
Filed Dec. 11, 1963
2 Sheets-Sheet 2

United States Patent Office 3,335,852
Patented Aug. 15, 1967

3,335,852

MOUNTING ASSEMBLY SUPPORTING SEMICONDUCTOR DEVICES

Ichiro Soma, Tokyo, Japan, assignor to Nippon Electric Company, Limited, Tokyo, Japan Filed Dec. 11, 1963, Ser. No. 329,686
Claims priority, application Japan, Dec. 20, 1962, 37/58,262
10 Claims. (Cl. 206—56)

Figure 4C:
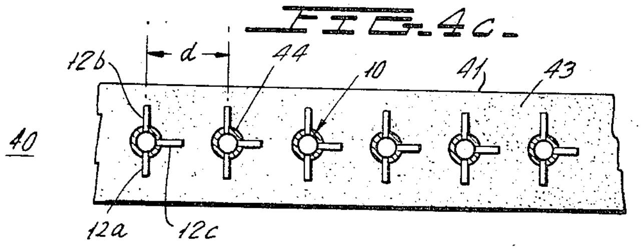

The instant invention relates to semiconductor devices and more particularly to method and apparatus for supporting such semiconductor devices during periods of handling or shipment so as to prevent such devices from being damaged.

With the advent of miniaturization and the present efforts being exerted to produce extremely light weight electronic components and equipment, such efforts have lead to the miniaturization of semiconductor devices as well. This has resulted in the production of semiconductor devices which are extremely small in size and which are provided with extremely thin and light weight conductive leads for use in attaching such semiconductor devices in miniaturized circuits.

Such semiconductor devices are typically comprised of a semiconductor element housed in a container which may or may not provide hermetic sealing. Extending from the container are the conductive leads which are normally soldered into the circuit in which the semiconductor device is to be employed. Such leads are extremely thin and light weight and are therefore readily deformable because of their inherent structures. Such leads may either be extremely thin wires or extremely thin tape-like leads which lend themselves readily to connection with other circuit elements typically by a soldering operation. Semiconductor devices having semiconductor elements coated with a glass or plastic material and tapelike terminals extending therefrom also have similar disadvantages. It therefore becomes extremely important that the external leads be protected during shipment, transportation, packing, or any other handling of such devices.

While the production of semiconductor devices is presently performed on a mass type assembly line basis enabling sizable numbers of such semiconductor devices to be produced in each batch, it is sometimes difficult to guarantee that each semiconductor device produced within a batch will have characteristics identical to all other semiconductor devices produced from that single batch. It is therefore quite common to provide characteristic data for each semiconductor device produced to enable the user to determine that semiconductor device which will perform most efficiently in a circuit in which it is to be employed.

The instant invention provides novel means for mounting semiconductor devices in a removable manner so as to protect the thin leads of each semiconductor device from damage during any handling thereof and further incorporates in the same means the capability of storing the semiconductor characteristics immediately adjacent the mounted semiconductor device to permit the user to select the particular semiconductor device having the most suitable characteristics.

The instant invention is comprised of a strip of pressure sensitive adhesive tape having first and second uncoated tapes aligned along the opposite edges thereof so as to expose only an elongated strip intermediate the edges of said adhesive tape. The semiconductor devices are mounted with their housings adhering to the exposed adhesive portion and are spaced at predetermined intervals. The extending conductive leads projecting from each semiconductor housing are aligned so as to overlie the uncoated paper sections. This is done to prevent contamination from the adhesive material of the tape which causes the soldering wetness of the conductive leads to be extremely poor due to adhesion of the external lead terminals of the semiconductor devices to the tape.

The uncoated tapes may preferably be of the dimensions of typical paper punch tape which is employed in paper puncher and reader units, such as telegraphy units. The spacing between adjacent semiconductor devices permits testing of each semiconductor device adhered to the tape for the purpose of determining the characteristics of each semiconductor device. The characteristic data may then be punched into the uncoated paper tapes immediately adjacent the associated semiconductor device so as to permit the selection of the semiconductor device having the most advantageous characteristics to be readily performed.

The arrangement of the supporting structure is such that mechanization of the mounting of semiconductor devices to the tape assembly may be performed in relatively simple and high-speed manner and further the tapes may be fed into a tape reader enabling simple high-speed selection operations of the semiconductor devices to be performed.

Various alternative embodiments of the tape assembly may also be employed in place of providing a pressure sensitive adhesive tape with first and second uncoated tapes along the opposite edges thereof. An uncoated strip may be coated with an adhesive material along its intermediate portion. Another alternative embodiment is comprised of providing a pressure sensitive adhesive strip completely covered with a second uncoated paper strip which is provided with a plurality of apertures arranged at spaced intervals along the length thereof. Each of said apertures expose circular areas of the adhesive material to which the semiconductor housings may adhere. Still another embodiment which may be provided is that of coating a pressure sensitive adhesive tape with a material such as talcum powder so as to render all of the pressure sensitive tape insensitive with the exception of small circular areas spaced at predetermined intervals to which each semiconductor housing may adhere.

After placement of each semiconductor device upon the pressure sensitive material, it is possible for purposes of handling and shipment to roll the tape assembly into a single reel and to ship the tape assembly in this manner. Adjacent layers of the tape roll prevent any physical contact with the semiconductor terminal leads thus providing a compact assembly for handling or shipment purposes in which the semiconductor terminal leads are prevented from being deformed as well as protecting the leads from contamination by the pressure sensitive adhesive material. It is further possible after delivery of such tape rolls to tear off only those sections which may be needed, thus permitting the rest of the roll to be stored for indefinite periods without any damage befalling the semiconductor terminal leads.

It is therefore one object of the instant invention to provide a novel method for removably mounting semiconductor devices and the like in a manner to prevent any damage to befall such devices.

Another object of the instant invention is to provide a novel arrangement for removably mounting a plurality of semiconductor devices and the like to facilitate handling, shipping and storage of such devices while preventing any damage from befalling devices so mounted.

Still another object of the instant invention is to provide novel means for removably mounting a plurality of semiconductor devices and the like which provides the dual functions of protecting such devices during handling and shipment thereof and further provides means for supplying the characteristics of the devices on said mounting means to facilitate the selection of a device having the appropriate characteristics from the mounting assembly.

Another object of the instant invention is to provide a novel assembly for removably mounting semiconductor devices and the like which is provided with a portion thereof having a pressure sensitive adhesive surface for removably mounting the semiconductor device and having the remainder of said surface being desensitized to protect the semiconductor terminal leads from contamination.

Still another object of the instant invention is to provide a novel arrangement for removably mounting semiconductor devices and the like to protect such devices from damage thereto during shipping and handling wherein said arrangement is comprised of a tape having sensitized adhesive areas along the member at spaced intervals thereof with the remaining area of the member being desensitized to protect the terminal leads of the device from contamination.

Still another object of the instant invention is to provide a novel arrangement for removably mounting semiconductor devices and the like to protect such devices from damage thereto during shipping and handling wherein said arrangement is comprised of a tape having sensitized adhesive areas along the member at spaced intervals thereof with the remaining area of the member being desensitized to protect the terminal leads of the device from contamination and further providing an arrangement suitable for providing characteristic data adjacent each semiconductor device so mounted to facilitate the selection of the most desirable device of the plurality so mounted.

Another object of the instant invention is to provide a novel arrangement for removably mounting semiconductor devices and the like to protect such devices from damage during handling and shipment thereof, which arrangement comprises an elongated strip of pliable material having adhesive coatings at spaced intervals along said strip and having the remaining areas desensitized wherein the adhesive strips secure the semiconductor housings and the desensitized areas prevent the terminal leads of the semiconductor devices from being contaminated, said assembly being suitable to permit electrical testing of the semiconductor devices so mounted and thereby simplifying the handling thereof.

These and other objects of the instant invention will become apparent when reading the accompanying description and drawings in which:

FIGURES 1*a* and 1*b* are plan and side views respectively of a typical semiconductor device.

FIGURES 2*a* and 2*b* are plan and end views respectively of one embodiment of a tape supporting assembly designed in accordance with the principles of the instant invention.

FIGURES 2*c* and 2*d* are plan and end views respectively of the assembly of FIGURES 2*a* and 2*b*, showing the manner in which the semiconductor devices of FIGURES 1*a* and 1*b* are mounted.

FIGURES 3*a* and 3*b* are plan and end views respectively of another embodiment of the instant invention.

FIGURES 3*c* and 3*d* are plan and end views respectively, of the arrangement of FIGURES 3*a* and 3*b*, showing the manner in which the semiconductors of FIGURES 1*a* and 1*b* are mounted thereto.

FIGURES 4*a* and 4*b* are plan and end views respectively, of still another embodiment of the instant invention.

Figure 4D:
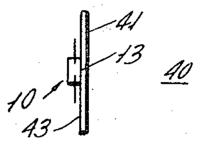

FIGURES 4*c* and 4*d* are plan and end views respectively of the embodiment of FIGURES 4*a* and 4*b*, showing the manner in which semiconductor devices are mounted thereto.

Figure 5A:
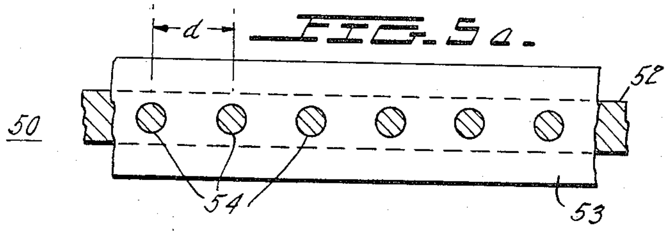
Figure 5B:
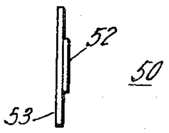

FIGURES 5*a* and 5*b* are plan and end views respectively, of still another embodiment of the instant invention.

Figure 5C:
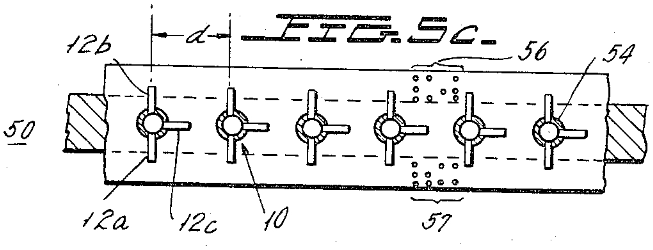
Figure 5D:
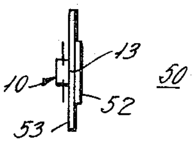

FIGURES 5*c* and 5*d* are plan and end views respectively, of the embodiment of FIGURES 5*a* and 5*b*, showing the manner in which semiconductor devices are mounted thereto.

Figure 6A:
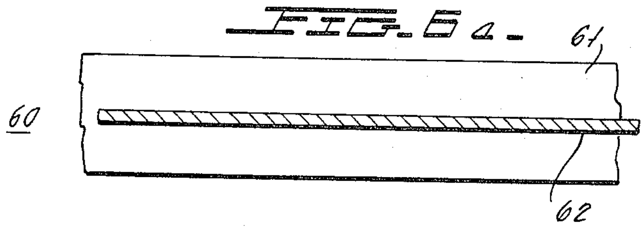
Figure 6B:
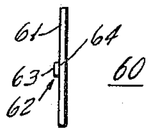

FIGURES 6*a* and 6*b* are plan and end views respectively of still another embodiment of the instant invention.

Figure 6C:
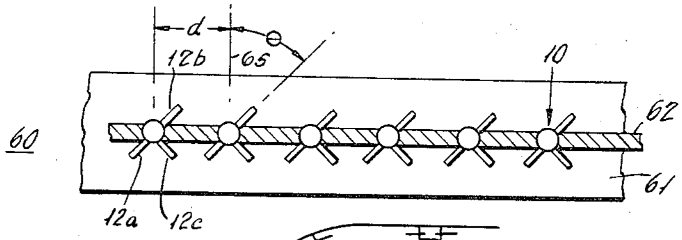
Figure 6D:
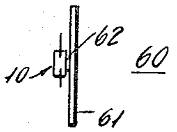

FIGURES 6*c* and 6*d* are plan and end views respectively of the embodiment of FIGURES 6*a* and 6*b*, showing the manner in which semiconductor devices are mounted thereto.

Figure 7:
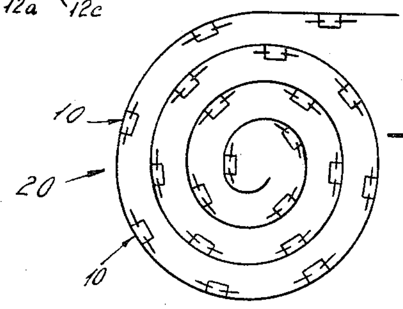

FIGURE 7 is an end view showing the manner in which any of the embodiments of FIGURES 2–6 may be prepared for handling and shipping purposes.

A typical semiconductor device, 10, is shown in FIGURES 1*a* and 1*b* and is comprised of a semiconductor element, 11, which is housed in container members 13 and 14. The semiconductor element 11 has projecting therefrom a plurality of terminal leads 12*a*–12*c* which are provided for the purpose of connecting the semiconductor device 10 to associated electronic circuitry. As can clearly be seen, these terminal leads 12*a*–12*c* are extremely thin, substantially flat and hence tape-like members which due to their physical configurations are inherently vulnerable to bending due to even slight impacts, thus rendering them deformable. In addition to the semiconductor device 10 of FIGURES 1*a* and 1*b*, similar semiconductor devices may, however, be provided with wire-like terminal leads. Such terminal leads are also relatively thin and hence deformable and it is extremely desirable to provide a measure of protection sufficient to prevent any damage to the terminal leads during handling or shipment thereof.

In FIGURES 2*a*–2*d*, there is shown therein a tape or strip-like assembly 20 provided for the purpose of removably mounting semiconductor devices of the type 10 to prevent such devices from being damaged or deformed during handling thereof. The assembly 20 is comprised of an elongated strip 21 which is coated with an adhesive material along the entire area of one surface 22. The assembly 20 is further provided with first and second elongated strips 23 and 24 which are coated tapes positioned in the manner shown so as to adhere to and cover all of the surface 22 of strip 21 with the exception of an elongated intermediate strip. The uncoated strips 23 and 24 may, for example, be paper punch tape of the type used in electronic computers and/or teletypewriter equipment. The mounting of strips 23 and 24 to adhesive strip 21 is a relatively simple operation and may be performed in a fully automatic manner. The length of the strips 21, 23 and 24 may be any length desired with a relatively short strip being shown in FIGURES 2*a* and 2*c* for the purposes of simplicity.

The semiconductor devices 10 are mounted to the assembly 20 so that the flat surface of container member 13 physically engages and is adhered to the intermediate adhesive strip of the assembly 20. The assembly has a width W, which is sufficient to insure that none of the conductive leads protrude upon the edges of the assembly. Thus, the semiconductor device 10, including the terminal leads 12*a*–12*c*, is completely supported by the assembly 20.

As can be seen in FIGURE 2*c*, the semiconductor devices 10 are arranged with their terminal leads, 12*b*, for example, forming an angle $\theta$ with the line 25 running transverse to the length of the tape assembly 20. This is done so that the terminal leads 12*a*–12*c* do not come in contact with and hence adhere to the adhesive surface 22. With this arrangement, this prevents the external leads 12*a*–12*c* from adhering to the adhesive surface 22 and protects the leads against any deformation when detached from the assembly 20 and further, prevents the wetness of the terminal leads to soldering from being effected due to any of the adhesive material which may adhere to the terminal leads surfaces after the semiconductor device has been detached.

After securement of the semiconductor devices 10 to the tape assembly 20, the tape may then be rolled so as to form a reel or spool of the type shown in FIGURE 7. The reel arrangement of FIGURE 7 may then be combined with electronic computer means (not shown) which is employed to punch encoded data on to either or both tapes 23 and 24, which encoded data is representative of the electrical characteristics of the associated semiconductor device. The semiconductor devices 10 are arranged at spaced intervals along the assembly 20 so that their central lines are a distance *d* apart. The distance *d* selected is chosen so that sufficient room is provided between adjacent semiconductor devices to enable each semiconductor device 10 to be connected to an electrical test circuit without any interference to the test by adjacent semiconductor devices. In addition thereto the space *d* is further chosen so as to permit sufficient room to punch the characteristic encoded data shown in the regions 27 and 28, which data represents the electrical characteristics of its associated semicondutor device. The punch data may be any suitable code such as 5, 6, 7 or 8 bit binary code, wherein each group of bits arranged in a line parallel to the phantom line 25 represents an alphanumeric character. The punch data may be provided on both strips 23 and 24. The actual performance of this operation may be such that the electronic computer under control of the measurements taken by the test circuit (not shown) will, in turn, operate a tape punch to punch out the encoded data into the punch tape in accordance with the electronic characteristics measured by the measuring circuit. The tape assembly 20 may then be cut any desired point along its length for the purpose of shipping as many or as few semiconductor devices to a particular destination as is desired.

Accordingly, the overal method of supporting semiconductor devices is comprised of the steps of measuring the electrical characteristics of the semiconductor devices, recording the results of such measurements, punching these results into the tape punchers in the region immediately adjacent the semiconductor device so tested and rolling the strip (of any desired length) into a spiral roll, as shown in FIGURE 7, for subsequent packing and shipment thereof.

FIGURES 3*a*–3*d* show still another embodiment of the instant invention wherein the tape assembly 30 shown therein is comprised of a tape or strip 31 being provided with a narrow, continuous strip of pressure sensitive adhesive material 32 arranged intermediate the edges of said strip. The semiconductor devices 10 are then so positioned along the tape that the container member 13 of the semiconductor housing is placed in physical engagement with and is adhered to the adhesive material 32. The semiconductor devices 10 are again aligned in the manner shown in FIGURE 2*c*, described previously, so that their terminal leads 12*b*, for example, describe an angle $\theta$ with the transverse phantom line 34. This alignment insures that the terminal leads 12*a*–12*c* are free from engagement with the adhesive strip 32 so as to prevent any contamination of these leads due to any adhesive material adhering thereto, which as previously mentioned, substantially effects the wetness quality of the terminal leads which, in turn, impairs any soldering joint made to the terminal leads.

The uncoated portions of the strip 31 are employed for the purpose of accepting punch data in the regions 35 and 36 to document the electrical characteristics of the associated semiconductor device. The assembly 30 may also be arranged in a roll in the manner shown in FIGURE 7 and further also lends itself to the receipt of punch code data in the areas 35 and 36 for the purpose of documenting the characteristics of semiconductor devices adjacent each associated device. The assembly 30 is likewise adaptable for use with a computer in the same manner as the assembly 20.

Turning now to FIGURES 4*a*–4*d*, there is shown therein still another alternative embodiment which is comprised of a supporting assembly 40 having an elongated strip 41 completely coated with an adhesive material along its surface 42. The adhesive surface is then sprayed with a fine powder 43, such as talcum powder, along its entire coded surface with the exception of the circular areas 44 which are uncoated so as to expose adhesive material. These exposed circular adhesive areas are then available to receive the semiconductor devices 10 in the manner shown in FIGURE 4*c* with the base member 13 of each semiconductor device being in engagement with an adhering to the circular area 44. The exposed areas 44 are shown to be circular and may be of any other suitable configuration such as square, rectangular, elliptical, and so forth, depending only upon the configuration of the particular container member which is to be adhered to the adhesive area. With the remaining surface area of the strip 41 being completely covered with the talcum powder, this renders the adhesive material beneath the talcum completely insensitive, thus protecting the terminal leads 12*a*–12*c* from any contamination due to exposure to and contact with the adhesive material. With the entire surface of the strip 41 being covered with the talcum powder with the exception of the circular areas 44, it is basically immaterial as to how the semiconductor terminal leads are aligned with the arrangement of the semiconductor terminal leads shown in FIGURE 4*c* being only one possible selection. The remaining surface area of the strip 41 may be employed to receive the punch code data in the same manner as previously described and further may be rolled in the fashion shown in FIGURE 7 to facilitate handling and shipping thereof. The distance *d* between the center lines of adjacent semiconductor devices 10 is chosen in the manner as previously described to permit electrical testing of each semiconductor device without interference from adjacent semiconductors and further to provide ample space and receipt of the punch code information.

FIGURES 5*a*–5*d* shows still another arrangement 50 for mounting and supporting semiconductor devices and is comprised of an elongated strip of material 51 which is coated with a suitable adhesive substance 52 along one surface thereof. The assembly 50 is further provided with a second tape member 53 having prepunched apertures 54 arranged at spaced intervals along the strip 53. The center lines of adjacent prepunched holes are separated by a distance *d* for the same reasons as previously described. Again, the shape of the openings provided in strip 53 are dependent only upon the particular configuration of the semiconductor housing and is not necessarily limited to a circular configuration but a square, rectangular, or elliptical configuration may be provided if desired.

The semiconductor devices 10 are arranged so that the flat surface of each base member 13 is positioned over each opening 54 in the manner shown in FIGURE 5*c*. Again it can clearly be seen that there is no specific limitation as to the angular orientation of the terminal leads 12*a*–12*c* and any angular orientation desired may be employed with the arrangement of FIGURE 5*c* being only one possible selection. The embodiment of FIGURES 5*a*–5*d* also lends itself readily to receiving punch code data, for example, in the regions 56 and 57, as shown in FIGURE 5*c*, so as to document the characteristics of the associated semiconductor device. This embodiment also lends itself readily to being arranged in a rolled up type fashion shown in FIGURE 7 as well as enabling the semiconductor devices to be affixed to the tape assembly tested for its electrical characteristics and receive punch data adjacent the semiconductor device in a mechanized manner, as was previously desribed.

FIGURES 6*a*–6*d* show still another embodiment 60 of the instant invention which is comprised of a first uncoated strip of tape-like material 61 and a pressure sensitive adhesive tape 62 which is coated with an adhesive material on both surfaces 63 and 64. The pressure sensitive strip 62 is arranged with its adhesive surface 64 making contact with and adhering to the strip 61. The surface 64 of the pressure sensitive adhesive tape should have a stronger adhesive property than the opposite surface 63 to which the semiconductor container is attached and by which such container is supported in the manner shown in FIGURES 6*c* and 6*d*. In the same manner as was previously described with respect to FIGURES 2*c* and 3*c*, the terminal leads of each semiconductor device such as, for example, the terminal lead 12*b*, is arranged to form an angle $\theta$ with the phantom line 65 so as to prevent the terminal leads 12*a*–12*c* from making engagement with the adhesive surface so as to prevent any contamination of the terminal leads by the adhesive material. The flat surface of the container member 13 is adhered to the adhesive surface 63 in the manner shown in FIGURE 6*d*. The uncoated strip 61 is capable of receiving punch code data in the same manner as previously described and further lends itself to being rolled up on the manner shown in FIGURE 7 as well as lending itself readily to the mechanization process concerned with the mounting, testing and documenting of the semiconductor devices.

As is clear from the description of the above embodiments, the present invention utilizes the adhesive surfaces of a pressure sensitive adhesive tape with the adhesive material being only partly coated upon one surface of the tape, or a material having a surface entirely coated with an adhesive material with the majority of the adhesive material being covered by an uncoated tape in order to support semiconductor devices along spaced intervals of the tape. Although the description of the above embodiments have referred to semiconductor devices having elements sealed in container members it is applicable to semiconductor devices having elements coated with a glass or plastic material and having tape-like terminal leads similar to those described herein.

The following are some advantages of the method set forth in the instant applicaton:

(1) A suitable assembly for mounting and supporting semiconductor devices may be produced in a high-speed automatic operation.

(2) Semiconductor devices may be mounted upon such a supporting assembly in an automatic arrangement.

(3) The semiconductor devices may be supported in a secure fashion along spaced intervals and in predetermined direction.

(4) Measurement of electrical characteristics of such mounted semiconductor devices and the documenting of such characteristics may be carried out in an automatic fashion after the mounting of semiconductor devices upon the tape assembly.

(5) By utilizing an electronic computer in conjunction with the measuring equipment for determining electrical characteristics of semiconductor devices, this lends itself readily to a means for providing punch code data along both edges of the supporting assembly by means of a suitable tape punch. The data may further be read out automatically by a tape reader and said devices may be marked accordingly under control of the tape reader by combining a marking machine with the tape reader output.

(6) The desired strength of adhesion of a pressure sensitive adhesive tape may easily be chosen and by using tape of a predetermined adhesion with relatively weak adhesive characteristics semiconductor devices may be readily and easily removed from said tape with little difficulty and transference of such semiconductor devices from one tape to another tape may also be readily performed.

(7) The external lead terminals of the semiconductor devices so mounted are protected from damage or bending when the devices are supported in the manner taught by the instant invention.

(8) Through the use of the configurations taught herein the external leads of the semiconductor devices are protected against contamination and poor soldering wetness while at the same time the semiconductor devices are suitably supported by means of the container member along the tape assembly.

(9) The supporting method described herein is not only advantageous to handling semiconductor devices during the manufacturing process, but the supporting tape assembly also lends itself readily to the handling, packing and shipping activities by protecting the terminal leads from damage, as well as providing a compact package for shipping purposes.

(10) By mounting semiconductor devices in the manner taught herein, any portion of an elongated tape assembly may be cut away so as to fill smaller or special purpose orders.

Since certain changes may be made in the above described arrangements and different embodiments may be made without departing from the spirit and scope thereof, it is intended that all subject matter contained in the above description or shown in the accompanying drawings shall be considered as illustrative and not in a limiting sense. For example, while the embodiments described above teach semiconductor devices arranged in a single row along each tape assembly, the present supporting assembly also lends itself by providing a tape assembly of a suitable width W to support a plurality of rows arranged in parallel along the tape and at spaced intervals thereof.

What is claimed is:

1. A mounting assembly in combination with semiconductor devices mounted thereon, said semiconductor devices each being comprised of a flat substantially thin housing having at least three thin fragile metallic leads extending outwardly from said housing in substantially radial fashion;

said mounting assembly being comprised of a first elongated strips of pliable material having a pressure-sensitive adhesive coating on one surface thereof;

first means being mounted to said pliable material allowing at least portions of the adhesive material to be exposed; the width ($w$) of said exposed adhesive surface being slightly greater than the outer dimensions of said housings;

the width of said first means being substantially greater than the largest outer dimension of said semiconductor devices as defined by the outermost ends of said metallic leads;

said semiconductor devices being mounted at spaced intervals along said mounting assembly with the housing of each semiconductor device being mounted upon an exposed adhesive surface region;

each of said semiconductor devices being angularly oriented relative to said mounting assembly so that their metallic leads are protected by said first means from said adhesive surface over substantially their entire lengths and are further protected from being deformed during assembly, disassembly and handling.

2. The combination of claim 1 wherein said mounting assembly is further provided with means to identify the characteristics of the semiconductor devices secured to said mounting assembly.

3. The combination of claim 1 wherein the width of said strip of pliable material is substantially equal to the width of said first means;

said first means being comprised of a powder deposited over said adhesive surface covering all of said adhesive surface with the exception of a plurality of exposed adhesive regions arranged at spaced intervals along said mounting assembly;

each region having a configuration substantially similar to the configuration of said semiconductor housings; the dimensions of each exposed region being slightly greater than the outer dimensions of said semiconductor housings.

4. The combination of claim 3 wherein said powder is talc.

5. The combination of claim 1 wherein said first means overlies and covers at least the edge portions of said adhesive surface so that the exposed adhesive surface between said covered edge portions has a width (*w*).

6. The combination of claim 5 wherein said first means is comprised of a second elongated strip of pliable material having a plurality of openings arranged at spaced intervals along said second strip;

said first strip being joined to said second strip by said adhesive so that exposed adhesive surfaces are provided at each opening;

the largest dimension of said openings being substantially equal to the width (*w*).

7. The combination of claim 1 wherein said first means is a second elongated strip of pliable material;

said first strip being coated on both surfaces with said adhesive;

one of said adhesive surfaces being joined to said second strip substantially midway from the edges of said second strip;

each of said semiconductor devices being aligned so that each of said metallic leads are aligned transversely to the exposed adhesive surface.

8. The combination of claim 7 wherein said mounting assembly is further provided with means to identify the characteristics of the semiconductor devices secured to said mounting assembly.

9. A method of supporting semiconductor devices and the like, each being comprised of a thin body portion having at least one flat surface and having at least three thin fragile metallic leads extending substantially radially outwardly from said body comprising the steps of:

providing an elongated strip of pliable material;

providing one surface of said strip with an adhering area arranged substantially along the longitudinal axis of said elongated strip;

forming said adhering area with a pressure-sensitive material such that the width of said adhering area at its widest portion is slightly greater than the largest dimension of the body portion of the semiconductor device to be adhered thereto;

attaching the flat surfaces of each semiconductor body to said adhering area, said semiconductor devices being arranged at spaced intervals along said adhering area;

aligning the metallic leads of each of said semiconductor devices so that the major portions of each of said leads do not overlie any of the exposed adhesive surface.

10. The method of claim 9 further comprising the steps of:

determining the characteristics of each of said semiconductor devices;

sorting said semiconductor devices in groups in accordance with predetermined characteristics;

and providing said strip with means for representing the characteristics of the semiconductor devices secured to said strip.

References Cited

UNITED STATES PATENTS

| | | | |
|---|---|---|---|
| 2,881,911 | 4/1959 | Krill. | |
| 3,039,604 | 6/1962 | Bickel et al. | |
| 3,050,186 | 8/1962 | Niles | 206—56 X |
| 3,061,762 | 10/1962 | Schlegel | 317—234 X |
| 3,069,751 | 12/1962 | Deakin. | |

FOREIGN PATENTS

| | | |
|---|---|---|
| 192,843 | 11/1957 | Austria. |
| 926,698 | 4/1955 | Germany. |
| 763,312 | 12/1956 | Great Britain. |
| 774,074 | 5/1957 | Great Britain. |

THERON E. CONDON, *Primary Examiner.*

M. L. RICE, *Assistant Examiner.*